(12) United States Patent
Wang et al.

(10) Patent No.: US 11,047,417 B2
(45) Date of Patent: Jun. 29, 2021

(54) FASTENING ASSEMBLY

(71) Applicant: GM GLOBAL TECHNOLOGY OPERATIONS LLC, Detroit, MI (US)

(72) Inventors: Pei-Chung Wang, Troy, MI (US); Bradley J. Blaski, Sterling Heights, MI (US); Steven Cipriano, Chesterfield Township, MI (US); Mark O. Vann, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 203 days.

(21) Appl. No.: 16/157,602

(22) Filed: Oct. 11, 2018

(65) Prior Publication Data

US 2020/0116188 A1 Apr. 16, 2020

(51) Int. Cl.
| | |
|---|---|
| *F16B 33/00* | (2006.01) |
| *F16B 25/10* | (2006.01) |
| *C23F 13/00* | (2006.01) |
| *F16B 39/282* | (2006.01) |
| *F16B 19/10* | (2006.01) |

(52) U.S. Cl.
CPC ........ *F16B 33/008* (2013.01); *F16B 19/1045* (2013.01); *F16B 25/106* (2013.01); *F16B 39/282* (2013.01); *C23F 13/00* (2013.01)

(58) Field of Classification Search
CPC .... F16B 33/008; F16B 25/106; F16B 43/001; F16B 35/06; C23F 13/00; C23F 2213/00
USPC ........................................ 411/383
See application file for complete search history.

(56) References Cited

U.S. PATENT DOCUMENTS

| | | | | |
|---|---|---|---|---|
| 951,437 | A * | 3/1910 | Gehrke | B65D 39/084 220/304 |
| 2,752,814 | A * | 7/1956 | Iaia | F16B 43/001 411/542 |
| 4,755,904 | A * | 7/1988 | Brick | B64D 45/02 244/1 A |
| 4,850,771 | A * | 7/1989 | Hurd | F16B 4/004 411/43 |

(Continued)

FOREIGN PATENT DOCUMENTS

| | | | |
|---|---|---|---|
| CN | 2594279 Y | 12/2003 | |
| CN | 202431725 U | 9/2012 | |
| KR | 101532622 B1 * | 6/2015 | ............... G01L 5/12 |

OTHER PUBLICATIONS

NPL#1: Heslehurst, Composite Engineer's Viewpoint, Composites Australia, Apr. 10, 2013, <https://web.archive.org/web/20130410104722/https://www.compositesaustralia.com.au/wp-content/uploads/2011/12/23-Mechanically-Fastened-Joints-in-Composite-Structures-Pt-5-Corrosion.pdf> (Year: 2013).*

(Continued)

*Primary Examiner* — Victor D Batson
*Assistant Examiner* — Amit Singh Dhillon
(74) *Attorney, Agent, or Firm* — Cantor Colburn LLP

(57) ABSTRACT

A fastening assembly includes a panel, a fastener and a primary anode insert. The panel defines an aperture and the fastener includes a shaft portion disposed within the aperture. The primary anode insert may be disposed adjacent to a reaction region of the fastener. Alternatively, the fastening assembly may include a fastener and a primary anode insert. The fastener includes a shaft portion which is configured to be disposed within at least two aligned component apertures. The primary anode insert may be also be disposed adjacent to a reaction region of the fastener.

22 Claims, 7 Drawing Sheets

(56) References Cited

U.S. PATENT DOCUMENTS

| | | | | |
|---|---|---|---|---|
| 5,018,920 A * | 5/1991 | Speakman | B21J 15/02 | 411/339 |
| 5,906,463 A * | 5/1999 | Damm | F16B 43/001 | 411/369 |
| 5,971,189 A * | 10/1999 | Baughman | B65D 39/084 | 220/288 |
| 6,485,242 B1 * | 11/2002 | Kikawa | F16B 43/001 | 184/1.5 |
| 6,499,926 B2 * | 12/2002 | Keener | F16B 19/06 | 411/504 |
| 7,150,852 B1 * | 12/2006 | Beierle | B05D 7/16 | 422/7 |
| 8,186,921 B2 * | 5/2012 | Lowman | F01M 11/0408 | 411/371.1 |
| 9,366,278 B2 * | 6/2016 | Ishida | F16B 11/006 | |
| 9,919,379 B1 | 3/2018 | Jang et al. | | |
| 2001/0022926 A1 * | 9/2001 | Kitayama | F16B 43/001 | 411/531 |
| 2002/0086178 A1 * | 7/2002 | Isacsson | F16B 1/0071 | 428/642 |
| 2003/0044256 A1 * | 3/2003 | Nickerson | F16B 33/004 | 411/338 |
| 2003/0086772 A1 | 5/2003 | Giannakakos | | |
| 2003/0190213 A1 | 10/2003 | Lutkus | | |
| 2006/0239792 A1 * | 10/2006 | Rau, III | B60B 23/00 | 411/13 |
| 2010/0124472 A1 * | 5/2010 | Nguyen | H01R 43/26 | 411/337 |
| 2012/0155988 A1 * | 6/2012 | Schumacher | F16B 33/06 | 411/369 |
| 2013/0097848 A1 * | 4/2013 | Inaba | F16B 43/001 | 29/525.06 |
| 2014/0196272 A1 * | 7/2014 | Krajewski | B21J 15/02 | 29/525.06 |
| 2014/0219745 A1 * | 8/2014 | Heeter | H01R 43/16 | 411/368 |
| 2015/0147136 A1 * | 5/2015 | Maurel | F16B 33/06 | 411/378 |
| 2016/0091009 A1 * | 3/2016 | Wang | B21J 15/027 | 29/524.1 |
| 2016/0123362 A1 * | 5/2016 | Iwase | F16B 5/08 | 411/82 |
| 2016/0146149 A1 * | 5/2016 | Soeda | F02F 1/24 | 411/8 |
| 2017/0298970 A1 * | 10/2017 | Bourges | C09D 123/06 | |
| 2017/0321839 A1 * | 11/2017 | Doerr | C23F 13/10 | |
| 2017/0350435 A1 * | 12/2017 | Chen | C25D 15/02 | |
| 2018/0057142 A1 * | 3/2018 | Wilkerson | B64C 3/185 | |
| 2018/0216649 A1 * | 8/2018 | Avery | B32B 1/08 | |
| 2018/0266463 A1 * | 9/2018 | Mori | B29C 65/562 | |
| 2019/0003514 A1 * | 1/2019 | Lackore, Jr. | F16B 5/02 | |
| 2019/0063485 A1 * | 2/2019 | Khosravani | B25J 13/087 | |
| 2019/0099828 A1 * | 4/2019 | Iitsuka | B23K 9/007 | |

OTHER PUBLICATIONS

NPL#1: Assembly Magazine—Flow Screw, Jan. 18, 2017, <https://web.archive.org/web/20170118182731/https://www.assemblymag.com/articles/93220-flow-drilling-screws-help-carmakers-shed-weight> (Year: 2017).*

NPL#2: Portland Bolt, Hex Bolts vs Hex Cap Screws, Portland Bolt & Manufacturing Company, Aug. 25, 2017 <https://web.archive.org/web/20170825021453/https://www.portlandbolt.com/technical/faqs/hex-bolts-vs-hex-cap-screws/> (Year: 2017).*

Chinese office action for CN Application No. 201910424057.7; dated Dec. 18, 2020 (pp. 1-8).

* cited by examiner

FASTENING ASSEMBLY

TECHNICAL FIELD

The present disclosure relates to an improved fastening assembly which is resistant to galvanic corrosion.

BACKGROUND

Fastener assemblies come in a variety of shapes, sizes, designs and materials. Many fastening assemblies include not only a fastener 114 such as a bolt, pin or screw, but also will include a fastener insert 122 to be positioned within a tapped hole of a substrate or threaded nut barrel 178 as shown in FIGS. 1A-1B. A bracket may also be viewed as a component of a fastening assembling given that a bracket may be used to couple one member to another member.

Stainless steel fastener have been passivated and coated with zinc chromate in an effort to prevent galvanic corrosion. As is generally known, galvanic corrosion is an electrochemical process between dissimilar metals and alloys having different electrode potentials such that one metal (the anode) corrodes preferentially when it is in electrical contact with a dissimilar metal (the cathode) in the presence of an electrolyte (ex: water and road salt). However, the application of the zinc chromate requires strict quantitative controls and is considered labor intensive. The installation tools for the fasteners may require frequent cleaning to prevent build-up of the zinc chromate on mandrels of the tool which is undesirable. The application of too little zinc chromate leads to certain other problems such as inadequate corrosion protection wherein undesirable galvanic corrosion 111 may develop across the fastener 114 and the threaded nut barrel 178. (See FIGS. 1A-1B). The galvanic corrosion 111 compromises the strength of the fastener assembly 110 and causes an unsightly appearance of the overall assembly due to the visibility of the corrosion across the fastener assembly 110. Other coatings may be formed from a fluoropolymer composition which is coated onto a stainless-steel fastener. However, aside from insufficient protection from galvanic corrosion when coating a fastener 114 (as previously noted), the additional step of applying a coating, sealant or plating to the insert can lead to added expense in the manufacturing process.

Accordingly, there is a need to provide a fastening assembly which provides improved resistance to galvanic corrosion in a cost-effective manner.

SUMMARY

The present disclosure provides a fastening assembly which may include a panel, a fastener and a primary anode insert wherein the primary anode insert is configured to function to preferentially undergo galvanic corrosion while the fastener (the secondary anode metal/alloy) experiences inhibited corrosion. Moreover, multiple embodiments of the present disclosure provide a fastening assembly which maintains its appearance despite undergoing galvanic corrosion. The panel defines an aperture and the fastener includes a shaft portion disposed within the aperture. The primary anode insert may be disposed adjacent to a reaction region of the fastener. The panel may, but not necessarily, be formed from a carbon fiber reinforced thermoplastic material and the fastener may be formed from steel. Moreover, the primary anode insert defines an insert thickness and a shape between an upper surface and a lower surface. In one non-limiting example, the primary anode may be a washer.

In another non-limiting example, the primary anode insert may be an elongated member such as, but not limited to a pin. The aforementioned fastener may, but not necessarily, be a rivet or a flow screw, nut, stud, and/or bracket.

In the example where the fastener is a rivet, the primary anode insert may be disposed adjacent to at least one of an interior ceiling surface of the rivet, a flange curve of the rivet, and a distal end of the rivet. It is understood that the rivet further defines a flange which may cover the primary anode insert and secure the primary anode insert against the panel. However, it is also understood that the flange may alternatively only cover a portion of the primary anode insert. With respect to the example where the fastener is a flow screw (self-piercing or extruding screw), the flow screw includes a cap which may cover the primary anode insert and secure the primary anode insert against an upper surface of the panel.

However, it is understood that the fastening assembly may optionally further comprise a retention component which engages with an engagement feature in the fastener. In this example having the additional retention component, the fastener may optionally be a mandrel and the retention component may be a sleeve. The mandrel may define a shaft integral to a head having an anode insert affixed to the head 63, and the sleeve may define a sleeve flange and a cylindrical body. In this embodiment, the fastening assembly may further include a secondary anode insert disposed between the sleeve flange and the panel.

In yet another example having the additional retention component, the fastener may optionally be a bolt having a threaded shaft and the retention component may be a nut (or collar) which is threaded (or swaged) onto the bolt's threaded shaft. In the aforementioned non-limiting example, a secondary anode insert may be disposed between the nut and a lower surface of the panel, and the primary anode insert being disposed between a cap of the bolt and the upper surface of the panel.

In yet another embodiment of the present disclosure, the fastening assembly may include a fastener and a primary anode insert. The fastener includes a shaft portion which is configured to be disposed within at least two aligned component apertures. The primary anode insert, may be also be disposed adjacent to a reaction region of the fastener. The primary anode insert may define an insert thickness between an upper surface and a lower surface. The fastener may, but not necessarily, be one of a rivet or a flow screw. However, it is understood that the fastener assembly may further comprise a retention component wherein the fastener may, but not necessarily be a bolt having a threaded shaft portion or mandrel. The retention component is configured to engage with an engagement feature in the fastener. Where the fastener is a mandrel, the retention component may be a sleeve. However, where the fastener is a bolt, the retention component may be a nut threaded onto the threaded shaft of the bolt. It is understood that secondary anode inserts may be implemented as part of the fastener assembly when a retention component is implemented.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1A:
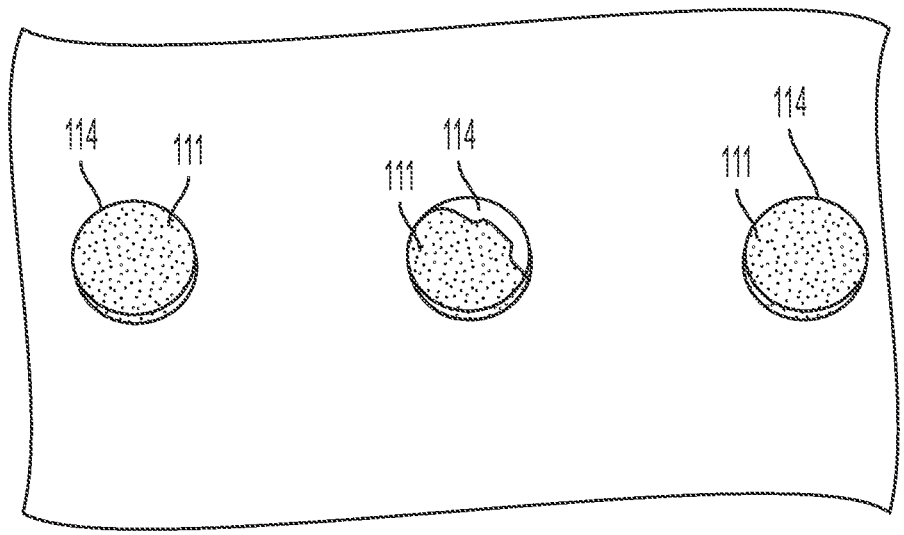
FIG. 1A is a top view of a plurality of fasteners used to secure a carbon fiber reinforced polymeric panel.
Figure 1B:
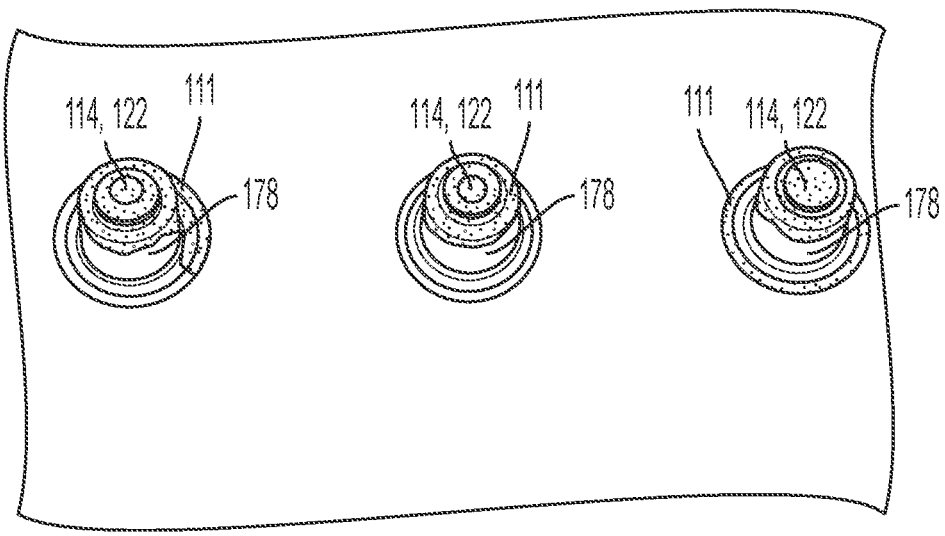
FIG. 1B is a bottom view of the plurality of fasteners in FIG. 1A used to secure the carbon fiber reinforced polymeric panel.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Referring now to FIGS. 2A-6B, the present disclosure provides a fastening assembly 10 which may include a plurality of panels 12, a fastener 14 and a primary anode insert 18. With respect to all embodiments of the present disclosure, the fastener 14 (non-limiting examples shown in FIGS. 2A-6B) has a higher electrode potential than the primary anode insert 18. The fastener 14 of the present disclosure may be provided in a variety of forms, such as but not limited to rivet, a flow screw, a bracket, a stud. As noted, a bracket may also be viewed as a component of a fastening assembling given that a bracket may be used to couple one member to another member.

Each panel 12 may optionally be formed from material with high potential (e.g., carbon fiber thermoplastic material) 26 which is very resistant to corrosion. In this circumstance, galvanic corrosion at the fastening assembly 10 may be accelerated given that panels 12 made from carbon fiber thermoplastic material 26 are very resistant to corrosion. Each panel 12 defines an aperture 20 and the fastener 14 includes a shaft portion 22 disposed within the aperture 20. The primary anode insert 18 may be disposed adjacent to a reaction region 24 of the fastener 14. The fastener 14 may be formed from metal (e.g., steel, stainless steel, etc.). Moreover, the primary anode insert 18 may define an insert thickness 32 between an upper surface 34 and a lower surface 36. As shown in FIGS. 2A-5A, the primary anode insert 18 may be completely embedded (or hidden) under the cap/flange of the fastener (or sleeve flange) so that the cosmetic appearance of the overall fastening assembly will not be detracted by the sacrificial corroding primary anode insert. The aforementioned fastener 14 may, but not necessarily be a rivet 42 or a flow screw 44. In one non-limiting example, the primary anode insert 18 may be a washer 38.

Figure 3A:
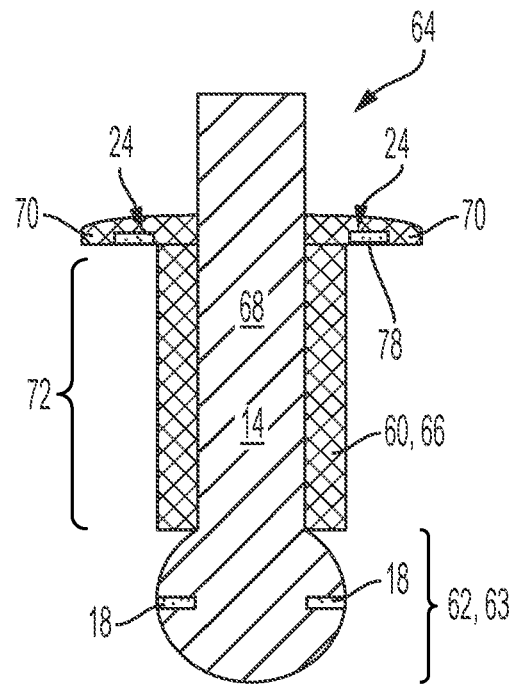
FIG. 3A is a cross sectional view of a second embodiment of the present disclosure prior to installation onto a panel.
Figure 3B:
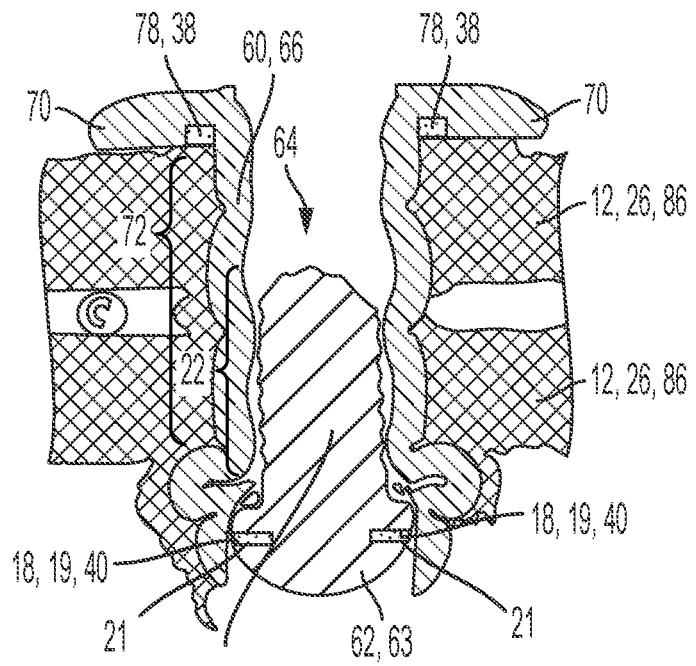
FIG. 3B is a cross-sectional view of the second embodiment in FIG. 3A when the fastener is fully installed.

In another non-limiting example, the primary anode insert 18 may be an elongated member 40 such as a pin 19 (see FIG. 3B) which may be press-fitted into the fastener 14 (shown as a mandrel 64 in FIG. 3B). Regardless of the configuration of the anode insert, the amount (weight) of the anode insert would depend on the contact area between the metal fastener and cathode (e.g., carbon fiber composite). The anode insert 18 should have sufficient material such that it would last for the life time of the fastener (e.g., 15 years for automotive application).

However, with reference to FIGS. 2A-3B, it is understood that the fastening assembly 10 may optionally further comprise a retention component 60 which engages with an engagement feature 62 in the fastener 14. In the non-limiting examples shown in FIGS. 3A-3B having the additional retention component 60, the fastener 14 may optionally be a mandrel 64 and the retention component 60 may be a sleeve 66 (see FIGS. 3A-3B) wherein the mandrel 64 deforms the sleeve 66 to form the fastening assembly 10. The mandrel 64 may define a shaft 68 integral to a head 63 having an anode insert affixed to the head 63, and the sleeve 66 may define a sleeve flange 70 and a cylindrical body 72. The primary anode insert 18 may be affixed to the head 63 in various ways. In one example, the primary anode insert 18 may be a pin 19 which is inserted into an aperture 21 defined in the head 63. (see FIG. 3B). In another non-limiting option, the primary anode insert 18 may be press-fitted into a groove/cavity/aperture 21 defined in the head 63. In this embodiment, the fastening assembly 10 may further include a secondary anode insert 78 disposed between the sleeve flange 70 and each panel as shown in FIGS. 3A-3B.

Figure 2A:
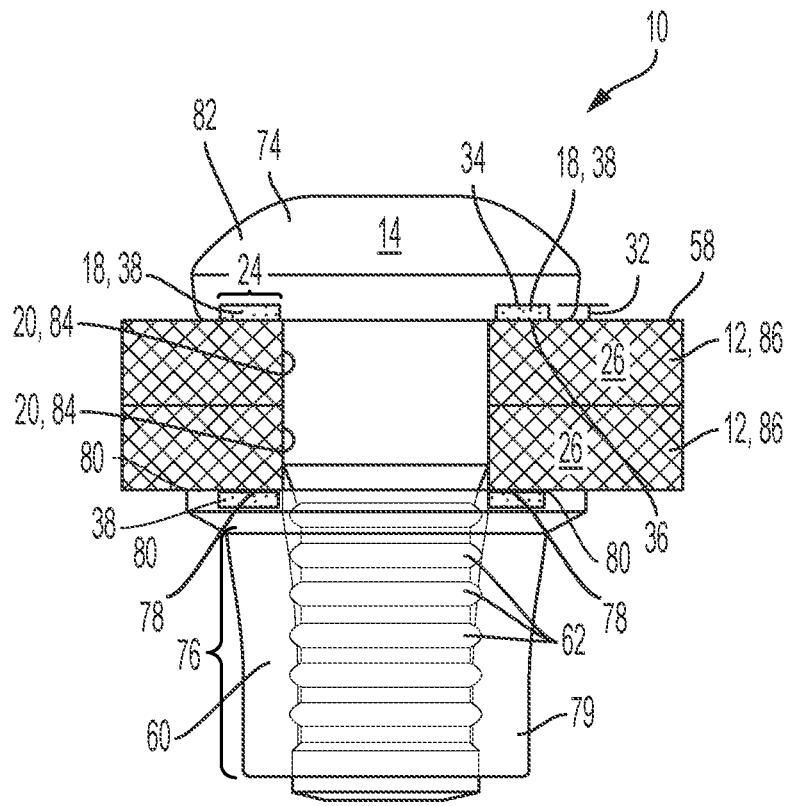
FIG. 2A is a cross-sectional view of a first embodiment of the present disclosure.
Figure 2B:
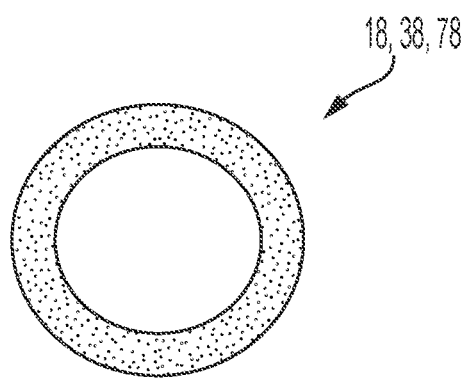
FIG. 2B is a top view of the anode inserts used in FIG. 2A.

With reference back to FIGS. 2A-2B, another example having the additional retention component 60 is shown wherein the fastener 14 is provided in the form of a bolt 74. The bolt 74 includes a threaded shaft 76 and the retention component 60 may be a nut (or collar) 79 which is swaged onto the bolt's threaded shaft 76. In the aforementioned non-limiting example, a secondary anode insert 78 may be integrated into the retention component 60 (nut 79 in FIG. 2A) such that the secondary anode insert 78 is adjacent to a lower surface 80 of the plurality of panels 12, and the primary anode insert 18 is integrated into the cap 82 of the bolt 74 such that the primary anode insert 18 is adjacent to the upper surface 58 of the plurality of panels 12. It is understood that the primary anode insert 18 in FIGS. 2A-2B is configured to preferentially undergo galvanic corrosion while the fastener 14 in the form of the bolt 74 and nut 79 experiences inhibited corrosion. Accordingly, the strength of the fastening assembly 10 is not compromised despite the galvanic corrosion which is concentrated at the primary anode insert 18 and secondary anode insert 78 because the corroded anode insert(s) 18, 78 are not located in a high stress region (at the stress raiser).

Figure 5A:
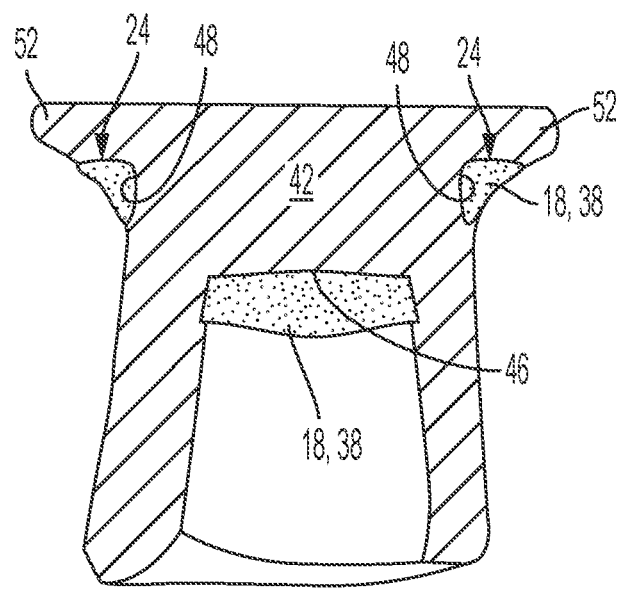
FIG. 5A a cross-sectional view of a fourth embodiment of the present disclosure.
Figure 5B:
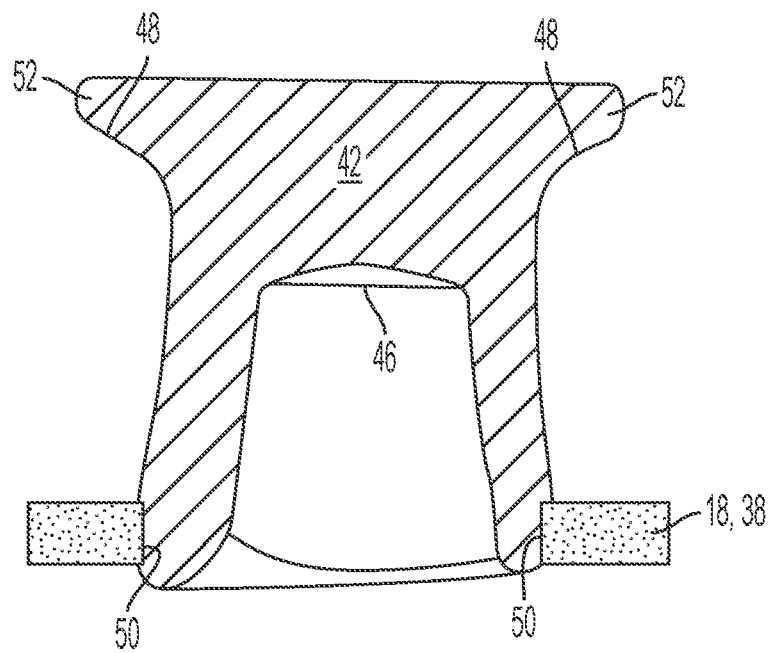
FIG. 5B is a cross-sectional view of a fifth embodiment of the present disclosure.
Figure 5C:
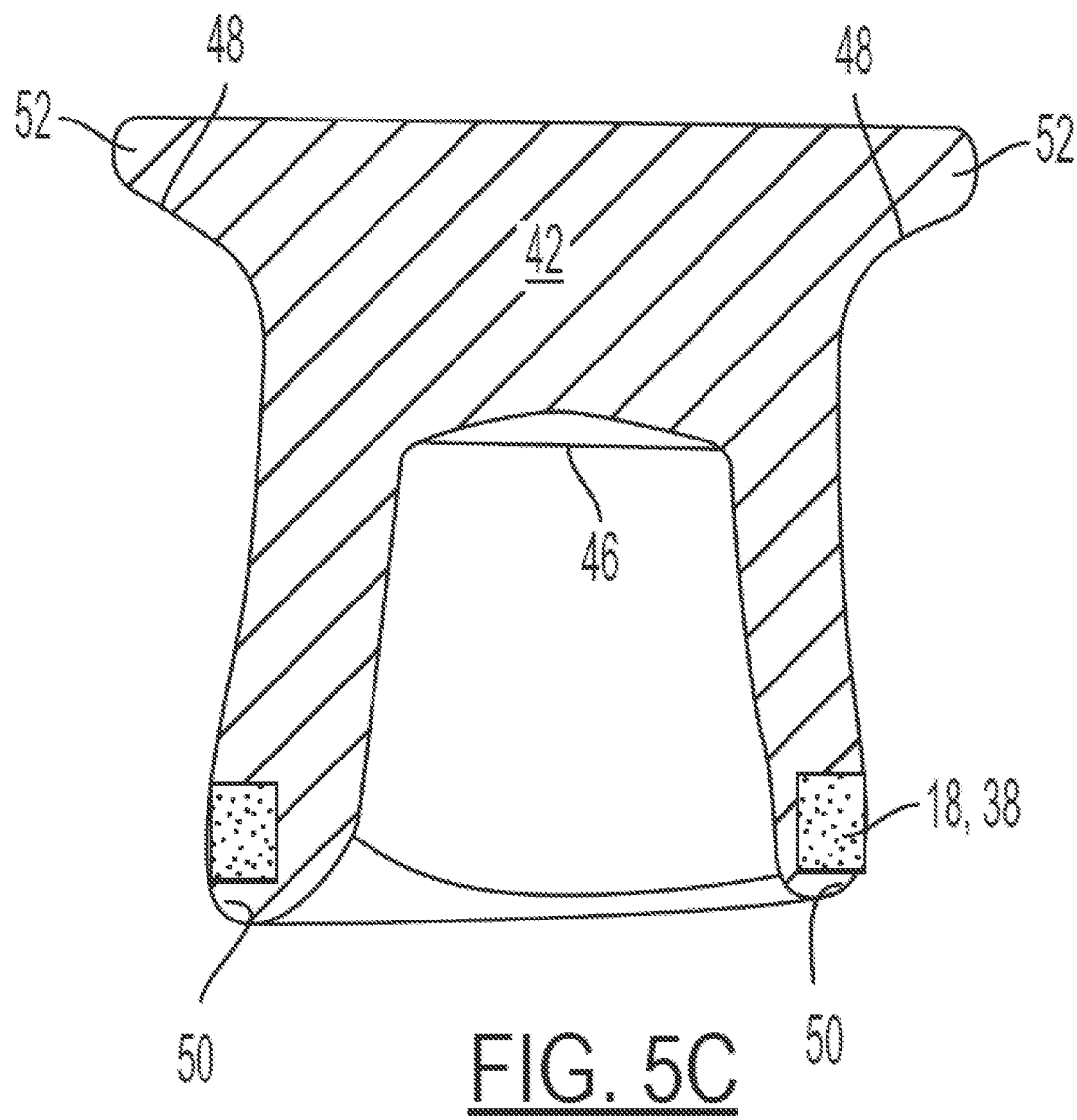
FIG. 5C is a cross-sectional view of the fastener assembly using a rivet wherein the anode insert is forged into the distal end of the rivet.
Figure 6A:
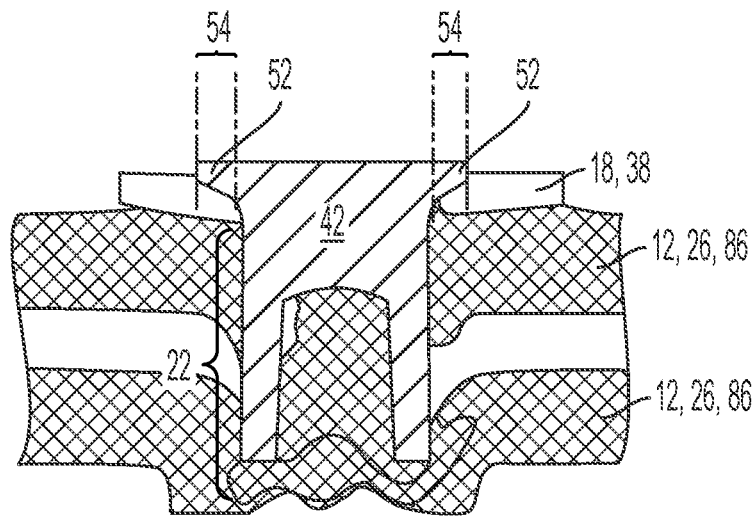
FIG. 6A is a cross-sectional view of a sixth embodiment of the present disclosure wherein the anode insert is partially exposed.
Figure 6B:
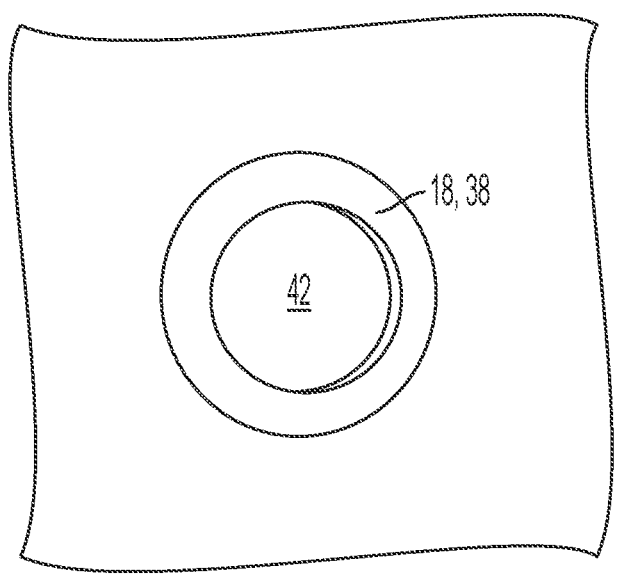
FIG. 6B is a top view of the fastening assembly in FIG. 6A.

With reference to FIGS. 5A-6B, the fastener 14 may be provided in the form of a rivet 42 wherein the primary anode insert 18 may be disposed adjacent to at least one of an interior ceiling 46 surface of the rivet 42 (see FIG. 5A), a flange curve 48 of the rivet 42 (see FIG. 5A), and a distal end 50 of the rivet 42 (see FIGS. 5B-5C). As shown in FIG. 5A, it is understood that the rivet 42 may further define a flange 52 which may cover the primary anode insert 18 and secure the primary anode insert 18 against each panel. However, it is also understood that the flange 52 may alternatively only cover a portion 54 of the primary anode insert 18 as shown in FIGS. 6A-6B. It is understood that the primary anode insert 18 in FIGS. 5A-6B is configured to preferentially undergo galvanic corrosion while the fastener 14 in the form of the rivet 42 experiences inhibited corrosion. Accordingly, the strength of the fastening assembly 10 is not compromised despite the galvanic corrosion which is concentrated at the primary anode insert 18 because the corroded anode insert 18 is not located at the stress raiser. Moreover, given that the anode insert 18 is hidden under the flange 52, the cosmetic appearance of the fastening assembly is not compromised as the anode insert 18 undergoes (sacrificial) galvanic corrosion.

In yet another embodiment of the present disclosure, the fastening assembly 10 may simply include a fastener 14 and a primary anode insert 18 as shown in FIGS. 2A-6B. As shown in the aforementioned figures, the fastener 14 includes a shaft portion 22 which is configured to be disposed within at least two aligned component apertures 84. As shown, each primary anode insert 18 may be also be disposed adjacent to a reaction region 24 of the fastener 14. The primary anode insert 18 may define an insert thickness 32 between an upper surface 34 and a lower surface 36. With reference to FIGS. 4-6B, the fastener 14 may, but not necessarily, be one of a rivet 42 (see FIGS. 5A-6B) or a flow screw 44 (see FIG. 4). However, as shown in FIGS. 2A-3B, it is understood that the fastener 14 assembly may further comprise a retention component 60 wherein the fastener 14 may, but not necessarily be a bolt 74 having a threaded shaft 76 or a mandrel 64. As shown in FIGS. 2A-3B, the retention component 60 is configured to engage with an engagement feature 62 in the fastener 14. With reference to FIGS. 3A-3B, the fastener 14 is provided in the form of a mandrel 64, and the retention component 60 is provided in the form of a sleeve 66. Sleeve 66 is configured to deform (see FIG. 3B) when mandrel 64 engages with the sleeve 66. However, as shown in FIGS. 2A-2B, where the fastener 14 is provided in the form of a bolt 74, the retention component 60 may be provided in the form of a nut 79 which is swaged onto the threaded shaft 76 of the bolt 74. It is understood that secondary anode inserts 78 may be implemented as part of the fastener 14 assembly when a retention component 60 is used as part of the assembly as shown in FIGS. 2A-3B. Accordingly, the primary anode insert(s) 18 in FIGS. 5A-6B is configured to preferentially undergo galvanic corrosion while the fastener 14 (the secondary anode metal/alloy) in the form of the rivet 42 experiences inhibited corrosion. Accordingly, the strength of the fastening assembly 10 is not compromised despite the galvanic corrosion which is concentrated at the primary anode insert 18.

Figure 4:
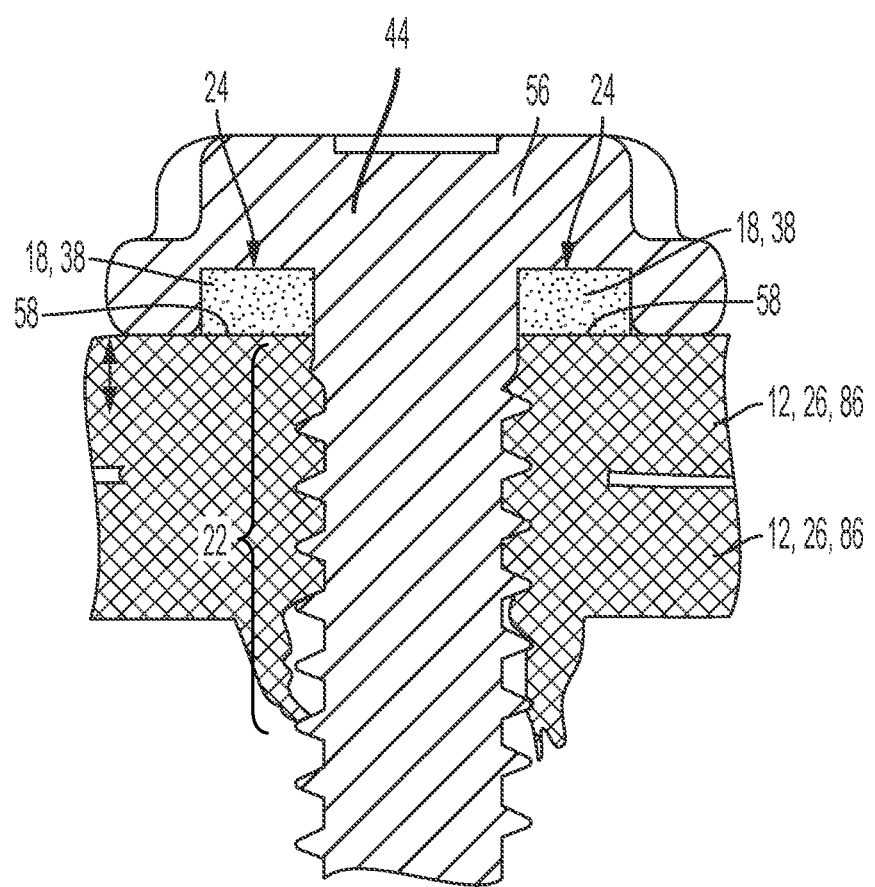
FIG. 4 is a cross-sectional view of a third embodiment of the present disclosure.

Referring now to FIG. 4, the fastener 14 may be provided in the form of a flow screw 44 wherein the flow screw 44 includes a cap 56 which may completely cover the primary anode insert 18 and secure the primary anode insert 18 against an upper surface 58 of the plurality of panels 12. Similarly, the primary anode insert 18 in FIG. 4 is configured to preferentially undergo galvanic corrosion while the fastener 14 in the form of the flow screw 44 experiences inhibited corrosion. Accordingly, the strength of the fastening assembly 10 is not compromised despite the galvanic corrosion which is concentrated at the primary anode insert 18. Moreover, the cap 56 of the flow screw 44 obscures the view of primary anode insert 18 as it undergoes galvanic corrosion.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A fastening assembly comprising:
   a panel defining an aperture;
   a fastener having a cap and a shaft portion extending from the cap, the shaft portion being disposed within the aperture, the fastener including a recess formed in the cap and extending at least partially about the shaft; and
   a primary anode insert disposed in the recess adjacent to a reaction region of the fastener, the primary anode insert including a continuous outer surface.

2. The fastening assembly as defined in claim 1 wherein the panel is formed from a carbon fiber reinforced thermoplastic material and the fastener is formed from steel.

3. The fastening assembly as defined in claim 1 wherein the primary anode insert defines an insert thickness between an upper surface and a lower surface.

4. The fastening assembly as defined in claim 3 further comprising a retention component which is configured to engage with an engagement feature in the fastener.

5. The fastening assembly as defined in claim 4 wherein the fastener is a mandrel and the retention component is a sleeve.

6. The fastening assembly as defined in claim 5 wherein the mandrel defines a shaft integral to a head having an anode insert affixed to the head, and the sleeve defines a sleeve flange and a cylindrical body.

7. The fastening assembly as defined in claim 6 further comprising a secondary anode insert disposed between the sleeve flange and the panel.

8. The fastening assembly as defined in claim 4 wherein the fastener is a bolt having a threaded shaft and the retention component is a nut threaded onto the threaded shaft.

9. The fastening assembly as defined in claim 8 further comprising a secondary anode insert being disposed between the nut and a lower surface of the panel, and the primary anode insert being disposed between a cap of the bolt and an upper surface of the panel.

10. The fastening assembly as defined in claim 3 wherein the fastener is one of a rivet, and a flow screw.

11. The fastening assembly as defined in claim 10 wherein the fastener has a higher electrode potential than the primary anode insert.

12. The fastening assembly as defined in claim 11 wherein a cap of the screw entirely covers the primary anode insert and secures the primary anode insert against the panel.

13. The fastening assembly as defined in claim 10 wherein the primary anode insert is disposed adjacent to at least one of an interior ceiling surface of the rivet, a flange curve of the rivet, and a distal end of the rivet.

14. The fastening assembly as defined in claim 13 wherein a flange of the rivet covers the primary anode insert and secures the primary anode insert against the panel.

15. The fastening assembly as defined in claim 13 wherein a flange of the rivet covers a portion of the primary anode insert.

16. A fastening assembly comprising:
    a fastener having a cap and a shaft portion extending from the cap, the shaft portion being configured to be disposed within at least two aligned component apertures, the fastener including a recess formed in the cap and extending at least partially about the shaft; and
    a primary anode insert disposed in the recess adjacent to a reaction region of the fastener, the primary anode insert including a continuous outer surface.

17. The fastening assembly as defined in claim 16 wherein the primary anode insert defines an insert thickness between an upper surface and a lower surface.

18. The fastening assembly as defined in claim 17 further comprising a retention component which is configured to engage with an engagement feature in the fastener.

19. The fastening assembly as defined in claim 18 wherein the fastener is a mandrel and the retention component is a sleeve.

20. The fastening assembly as defined in claim 18 wherein the fastener is a bolt having a threaded shaft and the retention component is a nut threaded onto the threaded shaft.

21. The fastening assembly as defined in claim 17 wherein the fastener is a screw.

22. The fastening assembly as defined in claim 16, wherein the cap entirely covers the primary anode insert.

* * * * *